US008430518B2

(12) United States Patent
Kirkup

(10) Patent No.: US 8,430,518 B2
(45) Date of Patent: Apr. 30, 2013

(54) LIGHTING CONTROL DESK WITH ENCODERS SURROUNDED BY COLOR-CODED VISUAL INDICATORS

(75) Inventor: Peter Kirkup, Gwent (GB)

(73) Assignee: Cooper Technologies Company, Houston, TX (US)

( * ) Notice: Subject to any disclaimer, the term of this patent is extended or adjusted under 35 U.S.C. 154(b) by 219 days.

(21) Appl. No.: 13/004,341

(22) Filed: Jan. 11, 2011

(65) Prior Publication Data

US 2011/0169430 A1 Jul. 14, 2011

Related U.S. Application Data

(60) Provisional application No. 61/293,877, filed on Jan. 11, 2010.

(51) Int. Cl.
*F21V 33/00* (2006.01)
*G06F 3/02* (2006.01)
*G06F 5/00* (2006.01)

(52) U.S. Cl.
USPC .......... 362/85; 345/170

(58) Field of Classification Search .......... 345/170
See application file for complete search history.

(56) References Cited

U.S. PATENT DOCUMENTS

| | | | | |
|---|---|---|---|---|
| 3,265,932 | A | 8/1966 | Pettersson et al. | |
| 4,392,187 | A | 7/1983 | Bornhorst | |
| 4,772,825 | A | 9/1988 | Tabor et al. | |
| 4,984,138 | A * | 1/1991 | Graham | 362/85 |
| 5,406,175 | A | 4/1995 | Speaker | |
| 5,414,328 | A | 5/1995 | Hunt et al. | |
| 5,940,521 | A | 8/1999 | East et al. | |
| 6,627,829 | B2 * | 9/2003 | Sato | 200/310 |
| 2008/0012848 | A1 | 1/2008 | Snyder et al. | |

OTHER PUBLICATIONS

PCT Search Report and Written Opinion for PCT/IB2011/000041 mailed on Aug. 26, 2011.
Cooper Controls; Jester ML; Product Specification; Oct. 2008.
Cooper Controls; Jester TL; Product Specification; Oct. 2008.
Cooper Controls; Leap Frog 48/96; Product Specification; Oct. 2008.
Cooper Controls; Frog 2; Product Specification; Oct. 2008.
Cooper Controls; ORB; Product Specification; Oct. 2010.
ETC SmartFade ML; Product Specification; Feb. 2008.
ETC Element Control Console; Product Specification; Software Kit Quick Guide; Apr. 20, 2010.
ETC; Ion Lighting Console; Knowledge Base; Dec. 31, 2009.
ETC; Eos Lighting Console; Operations Manual; Feb. 2007.
MA Lighting GrandMA series; Brochure; Jul. 7, 2010.

* cited by examiner

*Primary Examiner* — Douglas W Owens
*Assistant Examiner* — Dedei K Hammond
(74) *Attorney, Agent, or Firm* — King & Spalding LLP

(57) ABSTRACT

A lighting control desk includes a housing with a cavity provided within the housing and a control surface. The control surface includes digital displays, encoders, faders, push-button switches and a keyboard to assist in controlling different aspects of the light fixtures that are communicably coupled to the lighting control desk. A multitude of light-emitting visual indicators are positioned around one or more of the encoders. The visual indicators provide a visual indication of the color, hue, color saturation, or color intensity of the light fixtures being controlled by that particular encoder as well as the changes that will be effected to the color, hue, color saturation, or color intensity based on how the user may adjust the encoder. One or more light emitting diodes positioned in the cavity are optically coupled to each visual indicator to generate the color of light to be emitted through that particular visual indicator.

19 Claims, 8 Drawing Sheets

LIGHTING CONTROL DESK WITH ENCODERS SURROUNDED BY COLOR-CODED VISUAL INDICATORS

RELATED PATENT APPLICATION

This patent application claims priority under 35 U.S.C. §119 to U.S. Provisional Patent Application No. 61/293,877, titled "Lighting Control Desk With Encoders Surrounded by Color-Coded Visual Indicators" and filed Jan. 11, 2010, the complete disclosure of which is hereby fully incorporated herein by reference.

TECHNICAL FIELD

The technical field relates generally to lighting control desks. More specifically, the exemplary embodiments of the invention relate to systems, methods, and devices for providing dynamic, color-coded visual indicators at the encoders on a lighting control desk.

BACKGROUND

Traditionally lighting control desks have been designed around controlling dimmer packs (source controllers) or moving light fixtures. With the advent of affordable red-green-blue (RGB) light emitting diode (LED) fittings, a single dimmer channel is no longer an adequate way of controlling multi-attribute color fixtures, which require manipulation of multiple control channels simultaneously. On conventional lighting desks each light is controlled by a single fader, which gives control over the brightness of that light. Other conventional desks allow grouped channels (fixtures) to be controlled using encoders or syntax commands. These complex desks are designed around the control of multi-attribute moving position light fixtures, not color-changing static fixtures. In both these scenarios (faders or grouped encoders), the user interface and ergonomics are counterintuitive to controlling a single light with only a couple of additional parameters. On a fader-based desk the problem is that the user must learn the sequence of these controls and remember which ones are related to one another; on an encoder-based desk, the encoders do not provide any feedback as to what they are controlling, or the feedback is numerical when a user would often be more familiar with the color they wish to control.

Conventional encoder-based consoles typically offer either a Liquid Crystal Display in proximity to the encoder, or a monitor display which indicates the function of each encoder. Both of these solutions provide a visible, normally written, feedback of the level of the parameter being controlled. These solutions are often clunky and inelegant in their control of linear parameters because the numeric values attributed to linear parameters often bear little relation to the resulting color and therefore the user is left using trial and error to manipulate the parameters as required.

SUMMARY

For one aspect of the present invention. a novel lighting control desk for controlling multiple lighting devices can include a housing that has a cavity within the housing for components and a control surface along the top of the housing. The lighting control desk can also include encoders that are positioned along the top of the control surface. In addition, the lighting control desk can include a multitude of light-emitting visual indicators that are positioned around each of one or more of the encoders along the control surface.

For another aspect of the present invention, the lighting control desk can control one or more lighting devices and can include a housing. The housing can have a control surface defined along the top surface of the housing. The lighting control desk can further include one or more encoders positioned along the control surface. Each of the encoders can be configured to control the lighting aspects of one or more of the lighting devices. The lighting control desk can also include multiple light-emitting visual indicators. The visual indicators can be positioned adjacent to one or more of the encoders and can present a visual indication of the function of the encoder. In addition, the lighting control desk can include multiple LEDs, each LED being positioned within the housing and below the control surface. A first portion of the LEDs can be optically coupled to one of the light-emitting visual indicators and a second portion of the LEDs can be optically coupled to another one to a different light-emitting visual indicator.

For yet another aspect of the present invention, a method for controlling light output through the light-emitting visual indicators can include the step of providing multiple light-emitting visual indicators around an encoder on a lighting control desk. Each of the visual indicators can emit a different color of light. Those of ordinary skill in the art will recognize that the reference to color in this specification and claims is not just limited to the primary colors but also includes combinations of colors, shades of colors, color hues, color intensities, saturation levels for colors, all temperature ranges for colors and for the sake of clarity also includes white and black and all shades and temperature ranges for each. The method can continue by determining with a processor if the encoder has moved. If the encoder has moved, the process can determine which direction that the encoder moved. For example, the encoder could move clockwise or counterclockwise or up or down, depending on the type of encoder. The color being emitted through one or more of the light-emitting visual indicators can then be changed to a different color based on the direction that the encoder has moved.

These and other inventive concepts will be discussed herein below. The description hereinabove is not intended to be limiting in any manner and is simply a brief overview of some of the novel features of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The foregoing and other features and aspects of the invention are best understood with reference to the following description of certain exemplary embodiments, when read in conjunction with the accompanying drawings, wherein.

Figure 1A:
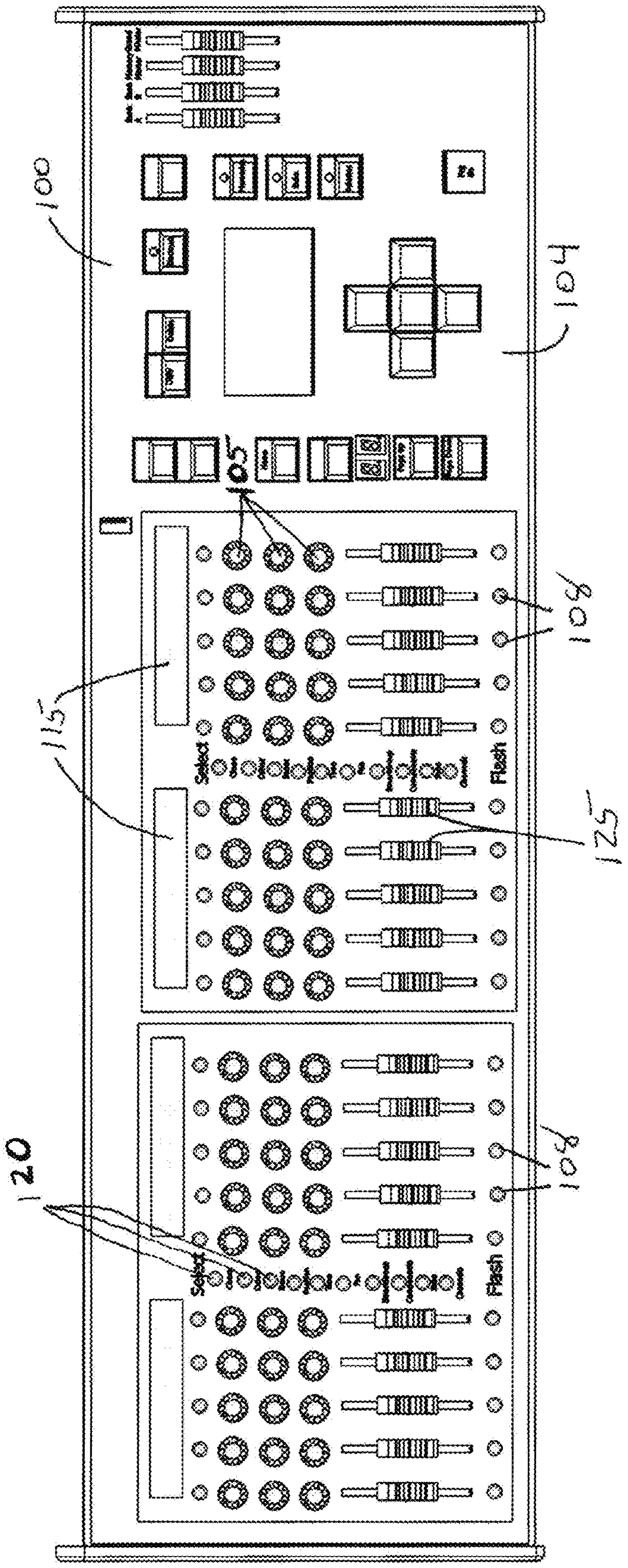
FIG. 1A is a partial top plan view of a lighting control desk in accordance with one exemplary embodiment.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles.

BRIEF DESCRIPTION OF EXEMPLARY EMBODIMENTS

Referring now to the figures, in which like numerals represent like (but not necessarily identical) elements throughout the figures, exemplary embodiments of the present invention are described in detail. Embodiments of the present invention are directed to lighting control desks having multiple encoder controllers, each controller being surrounded by a ring of color-changing indicators that provide visual color feedback to a user of the lighting control desk and notice to the user of the color capabilities under control of the particular encoder. FIGS. 1A, 1B, 2, and 3 are differing view of a lighting control desk 100 in accordance with one exemplary embodiment of the present invention.

Referring now to FIGS. 1A, 1B, 2, and 3, the exemplary lighting control desk 100 is typically manipulated by a user to control multiple lights and other devices in situations including, but not limited to, dance clubs, theaters, concert stages, and the like. The exemplary lighting control desk 100 includes a housing 102 having a control surface 104. A multitude of components 106 are disposed on the control surface 104 for controlling lights, automated lights (e.g., lights that move, lights that change colors, and gobo patterns), and other special effects devices, such as hazers and fog machines. In particular, the lighting control desk 100 includes faders (control slides) 125, pushbutton switches 108, 120, encoders 105, keypads 135, digital displays 115, and/or monitors 145. In one exemplary embodiment, the digital displays or monitors are touch screen control displays.

The exemplary faders 125 move in two opposing directions (e.g., front and back or left and right) along an axis. The faders 125 are typically used to adjust an attribute (e.g., brightness, color, direction, orientation, mode, etc.) of one or more of the lights or devices controlled by the lighting control desk 100. The exemplary pushbutton switches 108, 120 are typically actuated to activate or deactivate one or more lights, devices, or an attribute of one or more lights or devices. In one exemplary embodiment, the pushbuttons 120 provide a user with selection modes for controller and operating lights or other devices from the control desk 100. In certain exemplary embodiments, the section modes for the pushbuttons 120 include, but are not limited to, chase, color, beam, position, time, fan, smartgroup, components, subs, and channels.

The exemplary encoders 105 typically rotate in both the clockwise and counterclockwise direction to adjust an attribute of the one or more of the lights or devices. In one exemplary embodiment, each encoder 105 is a post encoder that extends up from the control surface 104 of the control desk 100 and is capable of rotating in both the clockwise and counter-clockwise direction to adjust an attribute of one or more of the lights or devices being controlled by the control desk 100. While the exemplary embodiment of the figures shows post encoders, other types of encoders known to those of ordinary skill in the art can be substituted without affecting the operation of the invention. In certain exemplary embodiments, the encoders 105 do not include rotational stops, thereby allowing for continuous rotation of the encoder 105 in both the clockwise and counter-clockwise direction. Alternatively, each encoder or a portion of the encoders 105 include position stops that prevent rotation in one or the other direction based on the specific needs of the user.

One or more of the encoders 105 is encircled by ring of color-changing visual indicators 110. In one exemplary embodiment, each encoder 105 is encircled by 8 or more color-changing visual indicators 110. While the exemplary embodiment presents a ring of color-changing visual indicators 110 around the encoder 105, the visual indicators can alternatively be positioned in other manners, such as linearly adjacent to, below or above the encoder 105 or in another desired shape around or next to the encoder 105. In certain exemplary embodiments, the color-changing visual indicators 110 are apertures with clear or substantially clear material disposed along or adjacent to the control surface 104 for receiving light being emitted from one or more LEDs positioned beneath the control surface. Furthermore, the exemplary color-changing indicators 110 are capable of displaying any desired color and capable of displaying a range of shades, hues, saturation levels, and/or intensity levels for each color within the color spectrum.

The exemplary control desk 100 of FIG. 1A includes three post encoders 105 above each fader 125, for controlling different aspects of lighting for one or more light fixtures. In one example, one of the three encoders 105 is encircled by different shades of red in each indicator 110, the second encoder is encircled by different shades of green in each indicator 110, and the third encoder is encircled by different shades of blue in each indicator 110 to control the shade of red, green and blue being output by the light fixture(s) being controlled by those encoders 105 (See FIG. 6). By encircling each encoder 105 with differing shades at the indicators 110, an operator of the control desk 100 is presented with a visual indication of exactly the color or shade of light being selected rather than or in conjunction with a numerical representation on the LCD display panel 115 or monitor 145.

Figure 3:
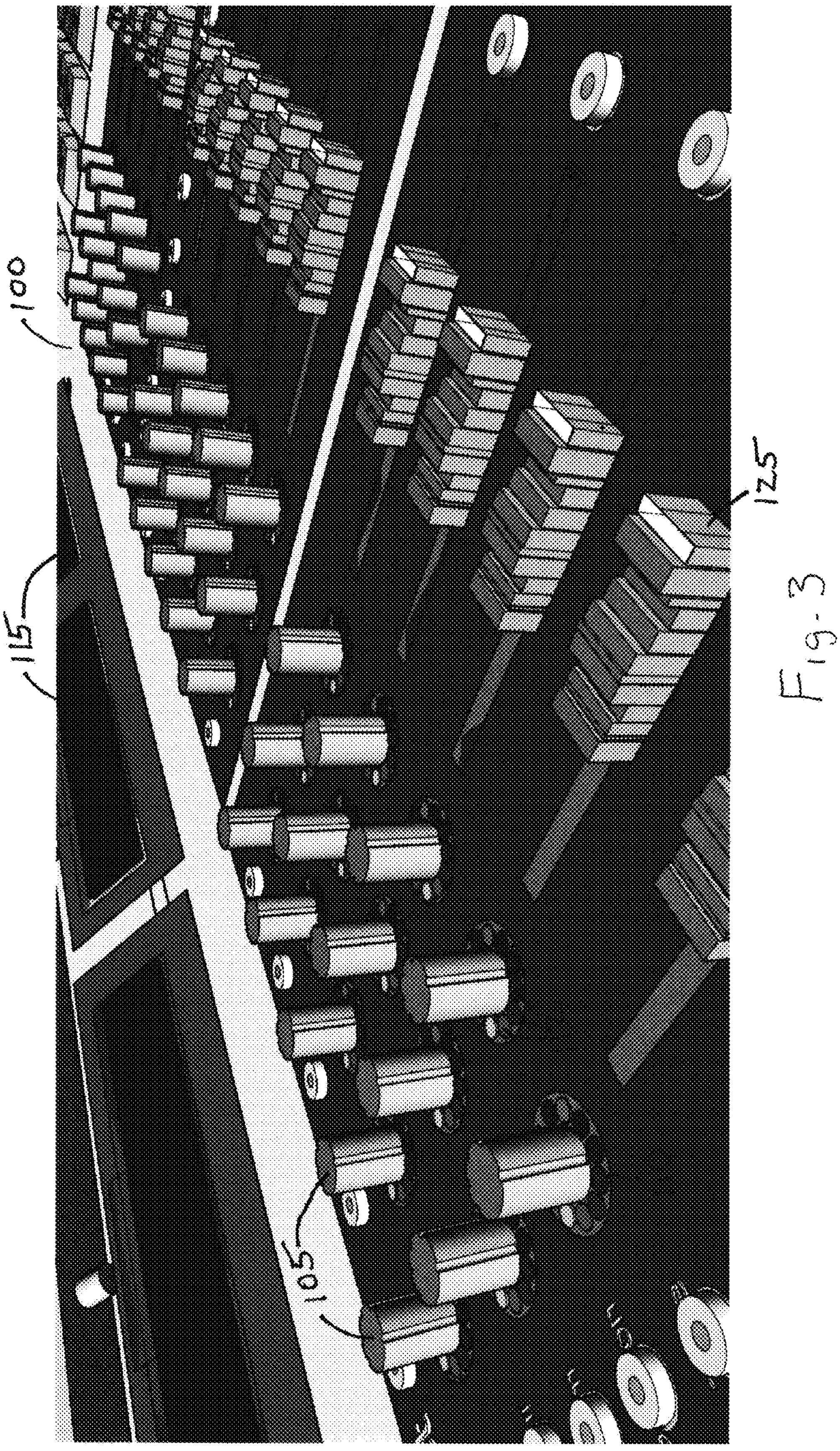
FIG. 3 is a partial perspective view of the exemplary lighting control desk highlighting the encoders and color-coded visual indicators of the exemplary lighting control desk of FIG. 1A in accordance with one exemplary embodiment.

In an alternative exemplary embodiment, each encoder 105 is capable of controlling the full range of the color spectrum for one or more light fixtures. In the alternative embodiment, the multiple indicators 110 around the encoder 105 display different colors or at least shades of different colors (as shown in FIG. 3). In certain embodiments, the indicators 110 may not show the entire spectrum of colors at one time but instead may present the entire spectrum as a under continues to rotate the encoder 105 either in the clockwise or counter-clockwise direction.

Figure 7:
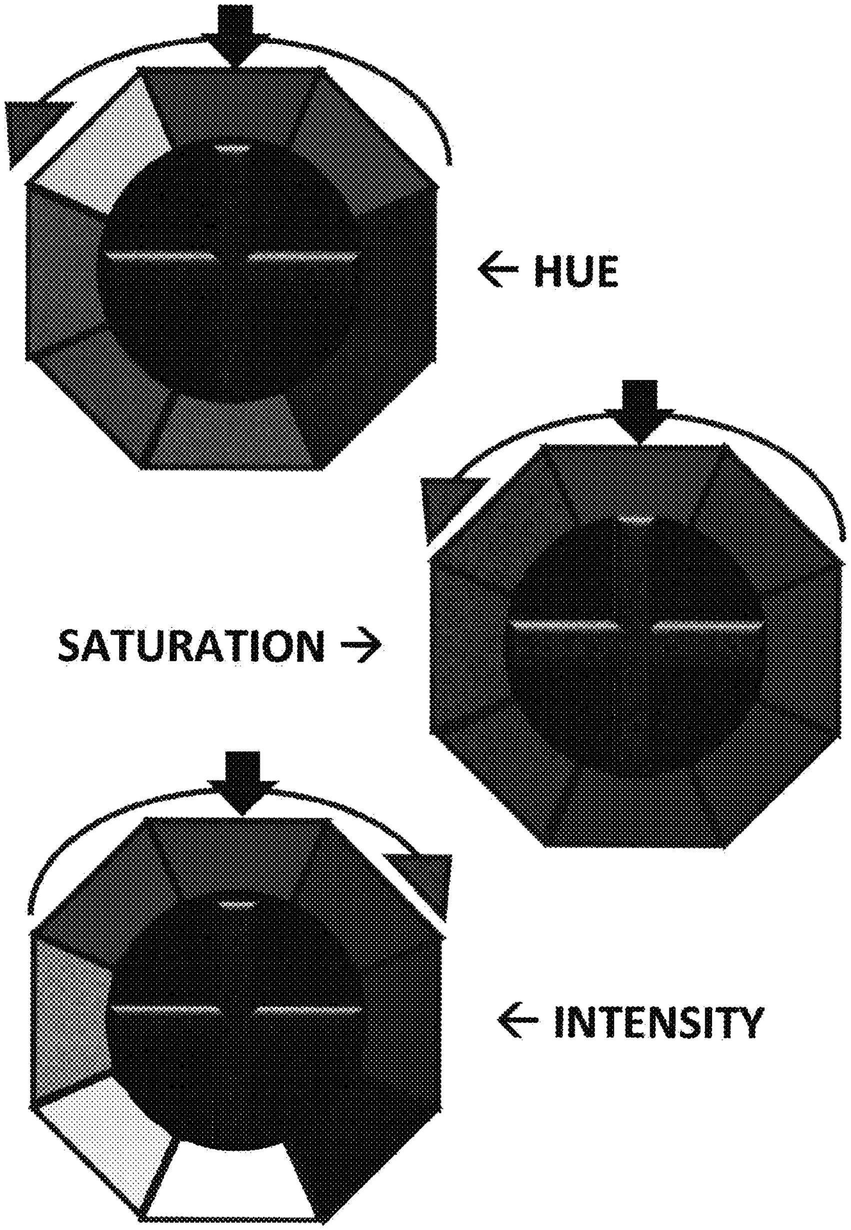
FIG. 7 is an exemplary representation of the control of hue saturation and intensity of light output through the visual indicators on the exemplary lighting control desk of FIG. 1A in accordance with one exemplary embodiment.

In another exemplary embodiment, each of the encoders 105 above each fader 125 controls one of hue, saturation, and intensity for the one or more light fixtures they control (See FIG. 7). By outputting different color hues from each of the visual indicators 110 around one encoder 105, different saturation levels from each of the visual indicators 110 around a second encoder 105 for the hue currently selected at the first encoder 105, and different intensity levels from each of the visual indicators 110 around a third encoder 105 for the hue currently selected at the first encoder, a user is able to control all three aspects independently for the lighting fixtures under control and be provided with a visual indication of the expected hue, saturation, and intensity level options at the user's disposal. In yet another alternative embodiment, hue, saturation, and intensity level is controlled at one encoder 105 and displayed through the visual indicators positioned around that encoder 105 and the user independent selects which they want to adjust, either through push buttons 108, 120, the touch screen monitor 145, or the entering the request in the keyboard 135. Once the user selects which they want to control, that range of aspects is provided in the visual indicators 110 around the selected encoder 105.

In further alternative embodiments or through the use of other encoders 105, each of the encoders 105 is also capable of controlling other color changing light fixtures using other various modes including, but not limited to, cyan magenta yellow (CMY) and effect speed size offset. In one exemplary embodiment, the modes are selected by a user depressing one or more of the mode selection buttons 120. While specific mode selection buttons 120 are shown for exemplary purposes only, each button can be programmed for a desired use based on the preference of the user. Thus, the combination of post encoders 105, a ring of visual light indicators 110 surrounding the post encoders 105 and the mode selection 120 allows for a visual indication of the mode and the current value being provided around the encoder 105 having specific control of that attribute. By displaying the ring of color on the indicators 110, the user will instantly be able to recognize the function of the encoder 105, its associated color value, and other selectable values available if the encoder is rotated in either direction. As will be discussed in greater detail with respect to the encoders in FIG. 4, the faders 125, pushbutton switches 108, 120, and encoders 105 are typically communicably coupled to a processor (discussed below) and programmed for a desired use based on the preference of a user.

The exemplary keypads 135 of the control desk 100 typically include numeric or alphanumeric keypads for configuring one or more lights or devices and for adjusting an attribute of one or more of the lights or devices controlled by the lighting control desk 100. The keypads 135 are generally used in conjunction with a digital display 115 and/or monitor 145, such as a liquid crystal display (LCD) screen to configure or control a light or device. For example, the keypads 135 are used to configure a network address for a light. In another example, the keypads 135 are used to enter a setting for a light, such as an intensity level, mode, or color. While the exemplary control desk 100 has been described as having several different types of control devices, such as the encoders 105, faders 125, pushbutton switches 108, 120 and keypads or keyboard 135, the lighting control desk 100 can also include other types of control devices known to those of ordinary skill in the art in addition to those shown or in place of those shown without affecting the operable capabilities of the lighting control desk 100.

Figure 1B:
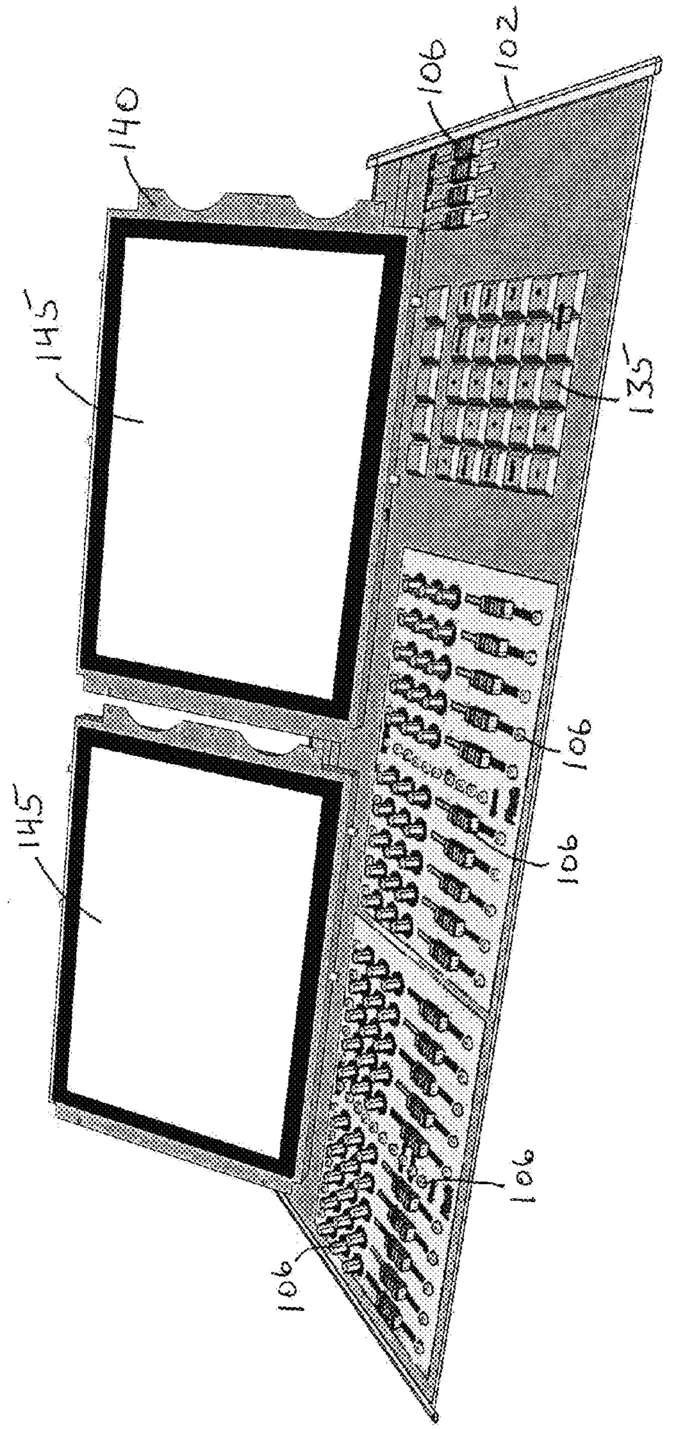
FIG. 1B is a partial perspective view of the lighting control desk of FIG. 1A in accordance with one exemplary embodiment.
Figure 2:
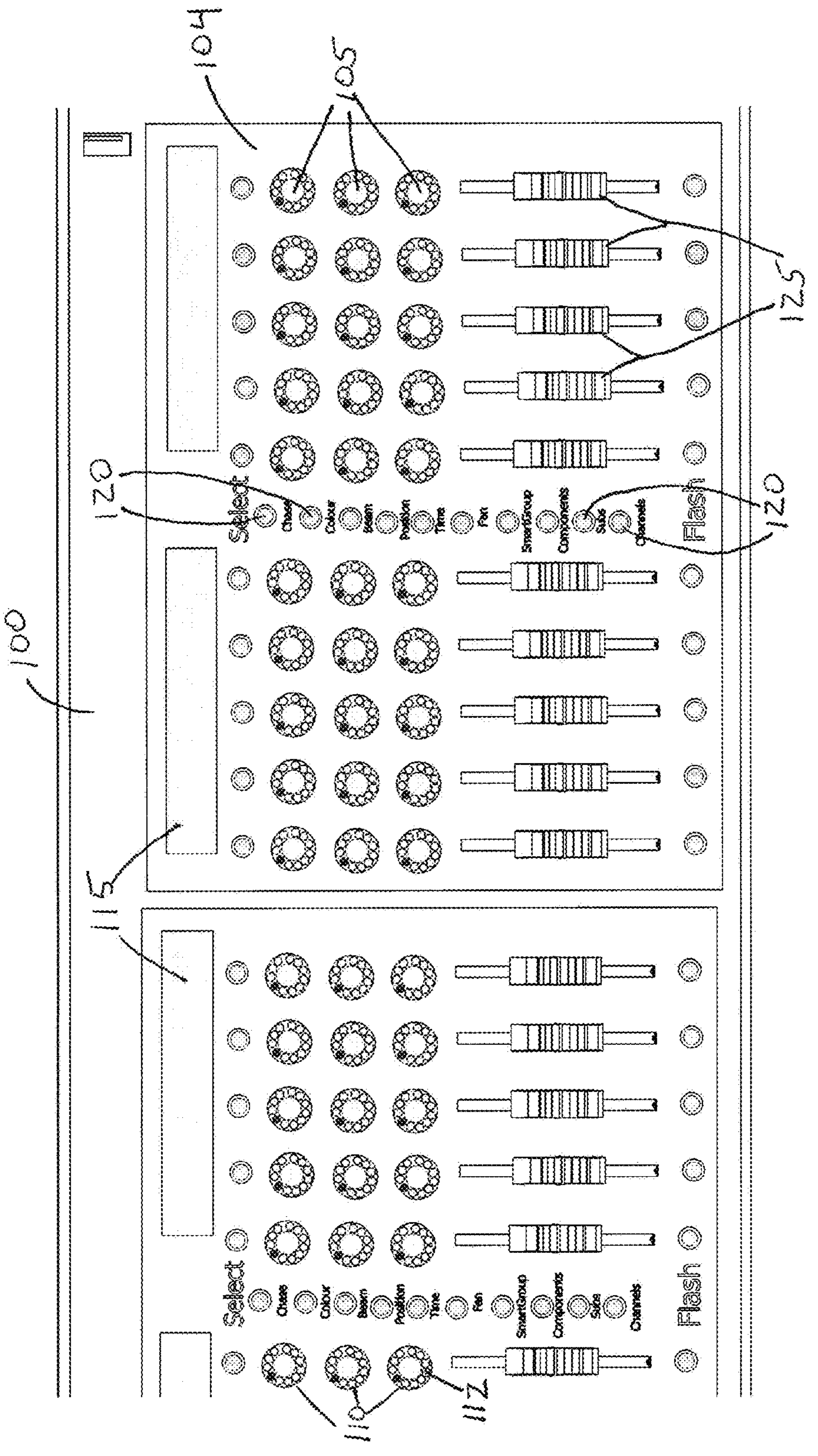
FIG. 2 is another partial top plan view of the exemplary lighting control desk of FIG. 1A in accordance with one exemplary embodiment.
Figure 4:
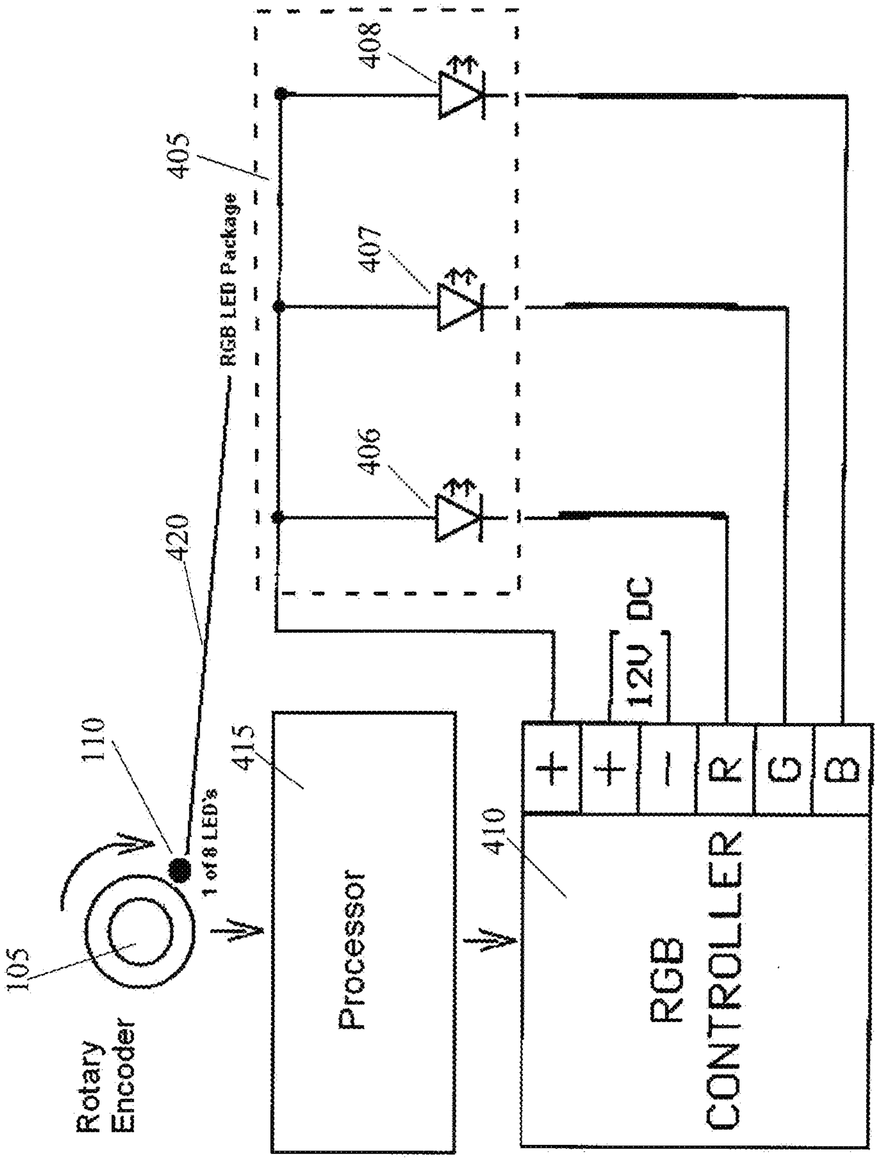
FIG. 4 is a block diagram of the control system for the LEDs emitting light through the visual indicators of the exemplary lighting control desk of FIG. 1A in accordance with one exemplary embodiment.

FIG. 4 is an exemplary block diagram for a control system 500 for controlling the light emitting through the visual indicators 110 by LEDs based on adjustment of an encoder 105 in accordance with one exemplary embodiment. Referring now to FIGS. 1A, 1B, and 4, the exemplary system 500 includes the rotary encoder 105, a visual indicator 110, a processor 415, one or more RGB controllers 410, and a RGB LED package 405. In one exemplary embodiment, the rotary encoder 105 and the visual indicators 110 are positioned along the surface 104 of the control desk 100 and the processor 415, RGB controller 410 and RGB LED packages 405 are positioned within the housing 102 of the lighting control desk 100. Alternatively, the processor 415 and/or RGB controller are positioned in a device other than but communicably coupled to the lighting control desk 100.

The processor 415 is communicably coupled to the rotary encoder 105 and the RGB controller 410. In one exemplary embodiment, the processor is a computer processor, such as a CPU. Alternatively, the processor 415 is a microprocessor. In one exemplary embodiment, a single processor 415 is communicable coupled with and communicates with each of the encoders 105 on the control desk 100. Alternatively, each encoder 105 or particular groups of encoders 105 are communicably coupled with and communicates with a different processor 415. In one exemplary embodiment, the processor 415 monitors the position of the encoder 105. When the processor 415 detects movement of the encoder 105, it determines how the encoder 105 moved and how much the encoder 105 moved and transmits that information to the RGB controller 410 so that the color output from one or more of the RGB LED packages 405 emitting light through the visual indicators 110 can be adjusted. In addition, the processor monitors the pushbuttons 108, 120 to determine if the use of the encoder 105 is changed based on user preference. When the processor 415 determines that a change has been made, the processor 415 retrieves information from a data storage device (not shown) to determine the previous values and communicates that information to the RGB controller so that the output from the RGB LED package 405 is adjusted based on the current state of the light component that is being adjusted.

The RGB controller 410 is communicably coupled to the processor 415 and the RGB LED package 405. In one exemplary embodiment, the RGB controller is a conventional RGB controller that is communicably coupled to multiple RGB LED packages 405. For example, in one exemplary embodiment, the RGB controller 410 is communicably coupled with and controls each of the RGB LED packages 405 for all of the visual indicators 110 around a single encoder 105. Alternatively, the RGB controller 410 is capable of controlling each of the RGB LED packages 405 for each of the visual indicators around multiple encoders 105. The RGB controller 410 receives a control signal from the processor 415 and converts that control signal into a control signal that adjusts the voltage provided to and thereby the output of one or more of the LEDs 406-408 in the RGB LED package 405.

The RGB LED package 405 is communicably and electrically coupled to the RGB controller 410 and optically coupled to the visual indicator 110. In one exemplary embodiment, the RGB LED package 405 includes a red LED 406, a green LED 407, and a blue LED 408. Alternatively, the RGB LED package includes other colored LEDs that through phosphor doping or other means are capable of emitting red, green and blue light. In an alternative embodiment, the RGB LED package includes a cyan emitting LED, a magenta emitting LED and yellow emitting LED. In certain exemplary embodiments, each RGB LED package 405 is optically coupled to a visual indicator 110 by way of a light pipe or waveguide 420. Alternatively, the RGB LED package 405 can emit light directly through the visual indicator 110.

Figure 5:
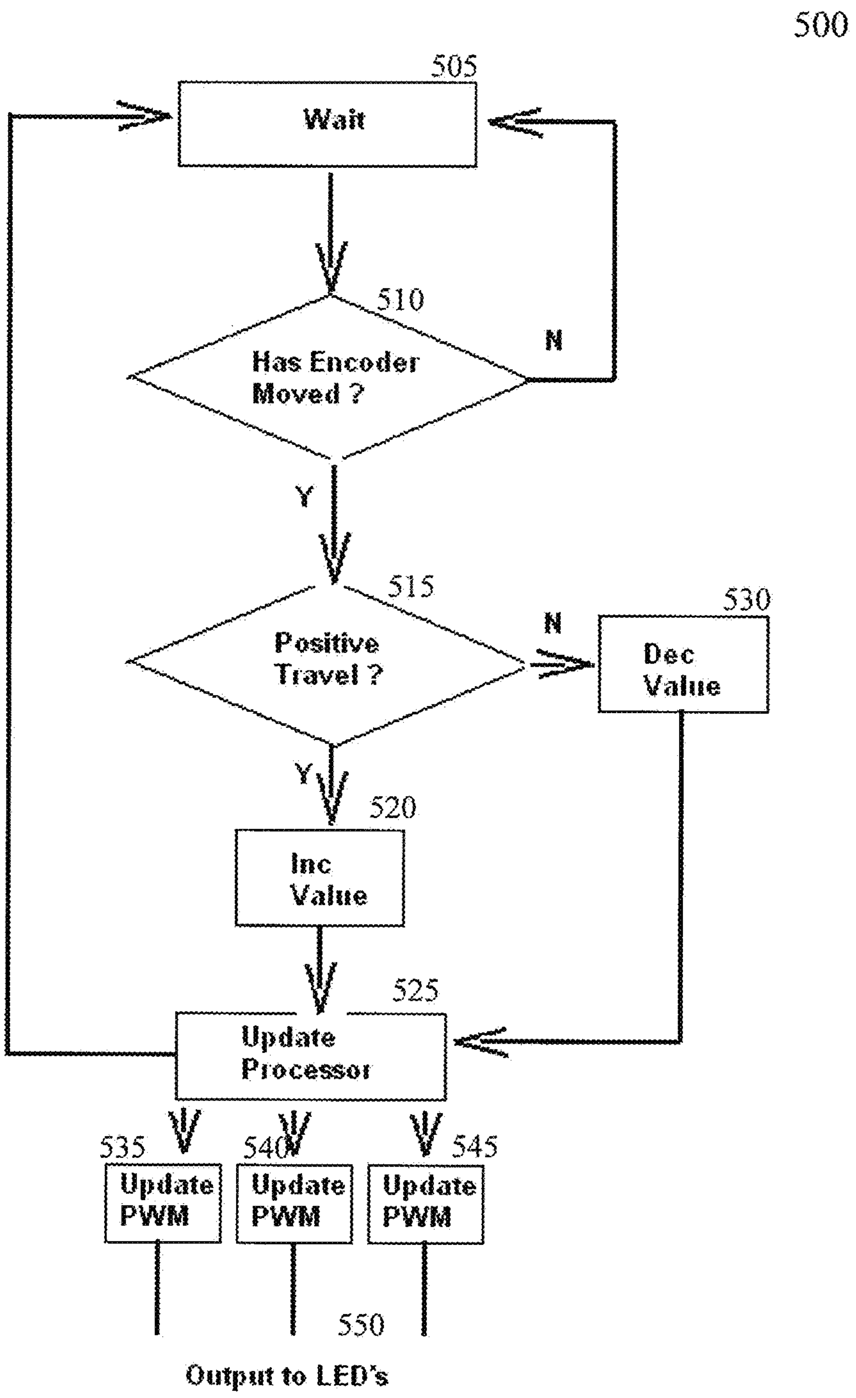
FIG. 5 is a flowchart diagram presenting an exemplary method for modifying the light output through the visual indicators of the exemplary control desk of FIG. 1A in accordance with one exemplary embodiment.

FIG. 5 is a flowchart presenting an exemplary method 500 for modifying the light output through one or more of the visual indicators 110 on the exemplary control desk 100 in accordance with one exemplary embodiment. Referring now to FIGS. 1A, 4 and 5, the exemplary method begins at step 505, where the processor 415 monitors for movement of the encoder 105 and waits until it detects movement. In step 510, an inquiry is conducted to determine if the encoder 105 has moved. In one exemplary embodiment, the determination as to whether the encoder 105 has moved and how much it has moved is made by a signal being passed from the encoder 105 to the processor 415. If it has been determined that the encoder 105 has not moved, the NO branch if followed back to step 505. Alternatively, if the processor 415 determines that the encoder 105 has moved, the YES branch is followed to step 515.

Figure 6:
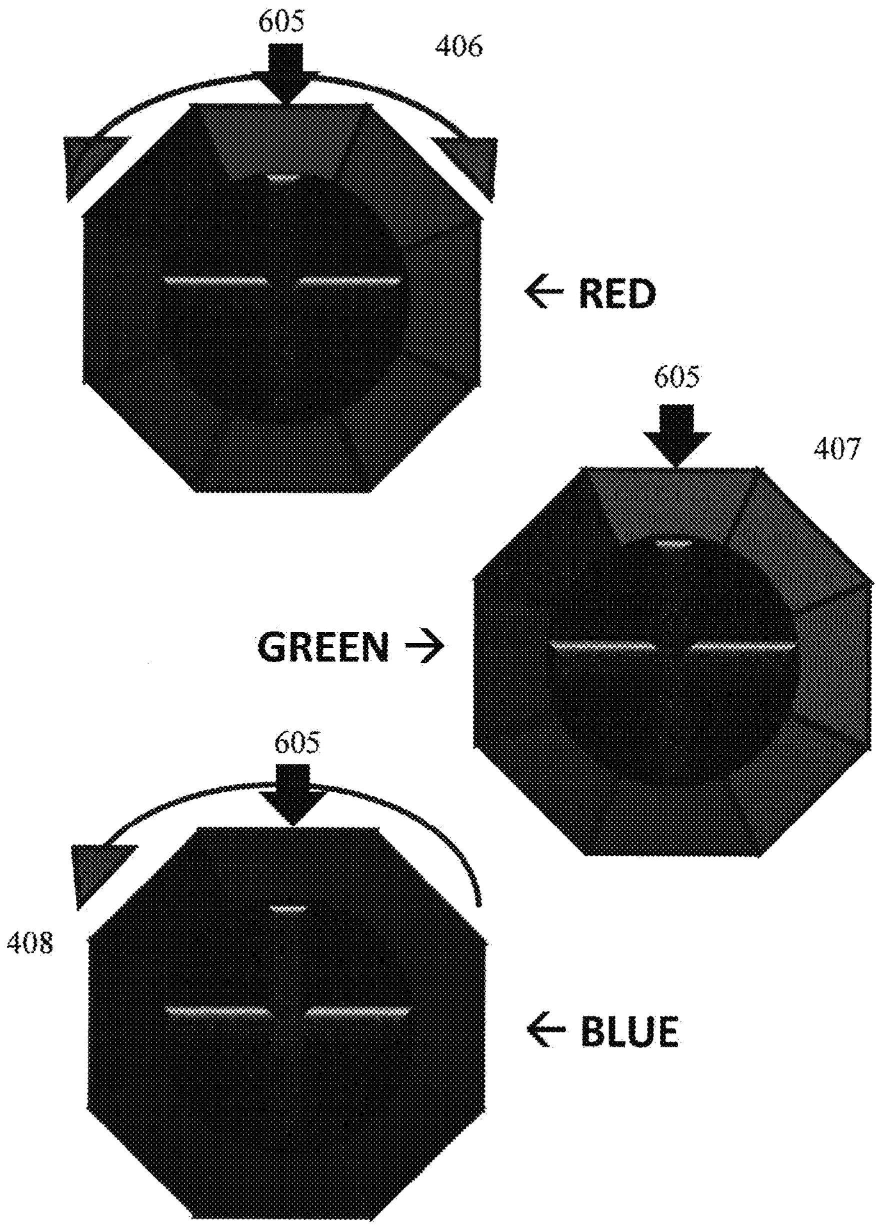
FIG. 6 is an exemplary representation of red-green-blue (RGB) color mixing for light output through the visual indicators on the exemplary lighting control desk of FIG. 1A in accordance with one exemplary embodiment.

In step 515, an inquiry is conducted to determine the direction of travel or movement of the encoder 105. In one exemplary embodiment, the processor 415, receives a signal or a change in the signal from the encoder 105 and is able to determine which direction the encoder 105 has been moved and how much it has moved. For example, in one embodiment the signal from the encoder 105 is a digital signal which is polled by the processor 415 at intervals for a value. If the value is positive, the encoder 105 has moved in the clockwise direction some distance. If the value is negative the encoder 105 has moved in the counter-clockwise direction some distance which can be determined by the processor 415. Once the value has been reported to the processor 415, the processor 415 resets the value back to zero. If the processor 415 determines that the encoder 105 has moved in a positive direction (for example in the clockwise direction), the YES branch is followed to step 520, where the processor increases the value associated with the encoder 105. In step 525, the value is updated in the processor 415. Returning to step 515, if the processor 415 determines that the encoder 105 has moved in a negative direction (for example in the counter-clockwise direction), the NO branch is followed to step 530, where the processor 415 decreases the value associated with the encoder 105. The process then proceeds to step 525 to update the value in the processor 415. In steps 535-545, the processor 415 sends a signal to the RGB controller 410 to change the desired pulse width modulation (PWM) for one or more of the LEDs 406-408 in the RGB LED package 405 for one or more of the visual indicators. The RGB controller 410 then sends a signal to one or more of the LEDs 406-408 modifying the pulse with modulation for one or more of the LEDs 406-408. For example, as shown in FIG. 6, one exemplary starting point for the LEDs 406-408 is each of the LEDs output being at maximum 605, and the resultant color being emitted through the visual indicator being white. As the encoder 105 is initially turned counterclockwise, red is removed from the output of the LED 406-408 and also from the light fixture under control of the encoder 105. The visual indicator 110 positioned at the top above the encoder is changed to the color of the current approximate output for the light fixture and the remainder of the visual indicators 110 (and the respective LEDs providing the emitting color for each) are changed to the color changes available within a range of 360 degree motion of the encoder based on the current color output selected for the light fixture. The process then returns to step 505 to await the next adjustment of the encoder 105.

Although the invention is described with reference to a preferred embodiment, it should be appreciated by those skilled in the art that various modifications are well within the scope of the invention. From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is not limited herein.

What is claimed is:

1. A lighting control desk for controlling a plurality of lighting devices comprising:

a housing comprising a control surface and a plurality of light emitting diodes (LEDs) disposed within the housing;

a plurality of encoders disposed on the control surface;

a plurality of light-emitting visual indicators disposed around at least one of the encoders;

wherein a first portion of the plurality of LEDs is optically coupled to a first light-emitting visual indicator of the plurality of light-emitting visual indicators; and a second portion of the plurality of LEDs is optically coupled to a second light-emitting visual indicator of the plurality of light-emitting visual indicators.

2. The lighting control desk of claim 1, wherein each encoder is communicably coupled to at least one light fixture and wherein the encoder controls a lighting aspect for the at least one light fixture.

3. The lighting control desk of claim 2, wherein each of the light-emitting visual indicators present a visual indication of the change in color emitted by the at least one light fixture when the encoder is directed to the particular light-emitting visual indicator.

4. The lighting control desk of claim 1, wherein the light-emitting visual indicators are disposed in a circular pattern around the encoder.

5. The lighting control desk of claim 1, wherein the encoders comprise post encoders.

6. The lighting control desk of claim 1, wherein each of the first and second portions of the plurality of LEDs comprises more than one LED.

7. The lighting control desk of claim 1, wherein each of the first and second portions of the plurality of LEDs comprises a first LED that emits light in the red color spectrum, a second LED that emits light in the green color spectrum, and a third LED that emits light in the blue color spectrum.

8. The lighting control desk of claim 1, further comprising:

a first light pipe disposed within the housing and optically coupling the first portion of the plurality of LEDs to the first light-emitting visual indicator; and a second light pipe disposed within the housing and optically coupling the second portion of the plurality of LEDs to the second light-emitting visual indicator.

9. The lighting control desk of claim 1, further comprising:

a processor disposed within the housing and communicably coupled to at least one of the plurality of encoders; and an LED controller disposed within the housing and communicably coupled to the processor and the first and second portion of the plurality of LEDs.

10. A method for controlling light output adjacent to an encoder on a lighting control desk comprising the steps of:

providing a plurality of light-emitting visual indicators around an encoder on a lighting control desk each indicator emitting a different color of light;

determining with a processor if the encoder has moved;

determining with the processor the direction that the encoder has moved based on a positive determination that the encoder has moved;

for at least one of the light-emitting visual indicators, changing the color of light emitted to a new color based on the direction that the encoder has moved.

11. The method of claim 10, further comprising the steps of:

transmitting a control signal from the processor to adjust a colored light output for a light fixture communicably coupled to the processor based on the direction that the encoder has moved; and changing the colored light output at the light fixture based on the signal from the processor.

12. The method of claim 10, further comprising the steps of:

communicably coupling the encoder with at least one light fixture to control colored-light-emitting aspects of the light fixture with the encoder; and receiving a selection at a pushbutton to control a colored light output for the light fixture with the encoder.

13. The method of claim 10, further comprising the steps of:

communicably coupling the processor to the encoder and a light fixture configured to emit light;

determining with the processor a current colored light output for the light fixture;

emitting with at least one light emitting diode (LED) the current color light output through one of the plurality of light-emitting visual indicators around the encoder; and for each of the other of the plurality of light-emitting visual indicators, emitting with at least one other LED a different color light output through the light-emitting visual indicator; wherein the different colors emitted from each of the light-emitting visual indicators represents the color of light output by the light fixture if the selection position of the encoder is directed to that particular indicator.

14. The method of claim 13, wherein the current color light output is emitted through the visual indicator closest to a current selection position for the encoder.

15. The method of claim 10, further comprising:

a plurality of LEDs optically coupled to each of the light-emitting visual indicators;

wherein changing the color of light emitted comprises changing a level of pulse width modulation to the at least one of the plurality of LEDs associated with the light-emitting visual indicator.

16. A lighting control desk for controlling a plurality of lighting devices comprising:

a housing comprising a control surface;

a plurality of encoders disposed on the control surface, wherein each encoder is configured to control a lighting aspect for at least one of the lighting devices;

a plurality of light-emitting visual indicators disposed adjacent to at least one of the encoders, wherein the light-emitting indicators present a visual indication of the function of the encoder;

a plurality of light emitting diodes (LEDs) positioned within the housing and below the control surface;

wherein a first portion of the plurality of LEDs is optically coupled to a first one of the light emitting visual indicators to emit colored light through the first one; and wherein a second, different portion of the plurality of LEDs is optically coupled to a second one of the light emitting visual indicators to emit colored light through the second one.

17. The lighting control desk of claim 16, wherein each of the first and second portions of the plurality of LEDs comprises a first LED emitting red colored light; a second LED emitting green colored light; and a third LED emitting blue colored light.

18. The lighting control desk of claim 16, wherein the plurality of light emitting visual indicators are disposed around the encoder in a substantially circular shape.

19. The lighting control desk of claim 16, wherein the plurality of light emitting visual indicators are disposed linearly along the control surface.

* * * * *